United States Patent
Lin

(10) Patent No.: US 7,137,096 B2
(45) Date of Patent: Nov. 14, 2006

(54) INTERCONNECT STRUCTURE OF A CHIP AND A CONFIGURATION METHOD THEREOF

(75) Inventor: Shi-Tron Lin, Taipei (TW)

(73) Assignee: Winbond Electronics Corporation (TW)

( * ) Notice: Subject to any disclaimer, the term of this patent is extended or adjusted under 35 U.S.C. 154(b) by 334 days.

(21) Appl. No.: 10/797,998

(22) Filed: Mar. 10, 2004

(65) Prior Publication Data

US 2005/0204324 A1    Sep. 15, 2005

(51) Int. Cl.
*G06F 17/50*    (2006.01)

(52) U.S. Cl. ............... 716/12; 716/10; 716/19

(58) Field of Classification Search .......... 716/8–14, 716/19

See application file for complete search history.

(56) References Cited

U.S. PATENT DOCUMENTS

| | | | |
|---|---|---|---|
| 6,701,509 B1 * | 3/2004 | Aggarwal et al. ............ | 716/13 |
| 6,763,511 B1 * | 7/2004 | Banno et al. ................ | 716/12 |
| 6,785,877 B1 * | 8/2004 | Kozai ........................... | 716/12 |
| 6,795,957 B1 * | 9/2004 | Lai et al. ...................... | 716/12 |
| 6,823,499 B1 * | 11/2004 | Vasishta et al. ................ | 716/7 |
| 6,925,627 B1 * | 8/2005 | Longway et al. ............. | 716/13 |
| 6,969,952 B1 * | 11/2005 | Gedamu et al. ............. | 315/94 |
| 6,978,434 B1 * | 12/2005 | Shigyo et al. ................ | 716/13 |
| 2001/0025365 A1 * | 9/2001 | Kuwabara ...................... | 716/5 |
| 2002/0013931 A1 * | 1/2002 | Cano et al. ..................... | 716/1 |
| 2004/0049754 A1 * | 3/2004 | Liao et al. ...................... | 716/8 |
| 2004/0243960 A1 * | 12/2004 | Hsu et al. ....................... | 716/8 |
| 2005/0028124 A1 * | 2/2005 | Gedamu et al. .............. | 716/12 |
| 2005/0071798 A1 * | 3/2005 | Chung et al. ................. | 716/13 |
| 2005/0160391 A1 * | 7/2005 | Orita ........................... | 716/13 |

\* cited by examiner

*Primary Examiner*—Stacy A. Whitmore
(74) *Attorney, Agent, or Firm*—Daniel B. Schein, Esq.

(57) ABSTRACT

A chip has a power bus, a first metal layer and a plurality of internal electronic circuits. The first metal layer has a plurality of power lines which are substantially parallel and electrically connected to the power bus in parallel for delivering electrical power to the internal electronic circuits. A plurality of metal lines of a second metal layer of the chip are configured by an automatic place and route (APR) process according to the internal electronic circuits, and at least one sparse area is formed on the second metal layer. Later, at least one supply-power area is configured in the sparse area, and is electrically connected to the power bus.

24 Claims, 8 Drawing Sheets

INTERCONNECT STRUCTURE OF A CHIP AND A CONFIGURATION METHOD THEREOF

BACKGROUND

1. Field of Invention

The present invention relates to an integrated circuit. More particularly, the present invention relates to an interconnection structure of a chip.

2. Description of Related Art

An integrated circuit is formed by shrinking many kinds of electronic circuits and lines into a chip, and uses a power bus to provide power needed by the foregoing electronic circuits.

FIG. 1 illustrates a schematic view of a conventional power delivering structure of a chip. As illustrated in FIG. 1, power rings 104a and 104b around a chip 100 are regarded as a power bus of the chip 100, and are connected to pad 102a and 102b, respectively, for providing different voltages. The voltage of the pad 102a is high (VDD), and the voltage of the pad 102b is low (VSS). Moreover, several power lines 106a and 106b are parallel in the core of the chip 100, and are connected to the power ring 104a and 104b, respectively, for uniformly delivering power to electronic circuits in the core of the chip (not illustrated in the figure).

However, this conventional power delivering structure has the following disadvantages:

1. The power rings are too large and waste valuable and limited space in the chip. A typical width of the conventional power ring is between about 20 and 40 micrometers. If the width of the power ring is reduced, a voltage drop caused by the reduced width makes the operating voltage reduction, and/or some internal electronic circuits operate under the rated voltage. A typical area of an integrated circuit is about 9000000 square micrometers, and if a width of a power ring around the integrated circuit is 30 micrometers, the power ring occupies about 7% of the area of the integrated circuit. This is very wasteful of the valuable and limited area of the chip.

2. The power delivering of the internal electronic circuits is limited in a pre-determined route, which cannot supply power flexibly. Moreover, if certain electronic circuits in the delivering route consume too much electric power, a voltage drop occurs, and the voltage supplying for other electronic circuits is therefore degraded. In addition, as illustrated in FIG. 1, the power delivering structure delivers electric power to the electronic circuits with a long and narrow power line, and if the chip is very large, a power distribution uniformity issue easily occurs and affects the chip performance.

SUMMARY

It is therefore an objective of the present invention to provide a configuration method of interconnects of a chip, where after configuring metal lines of a metal layer with an automatic place and route process, a supply-power area is then configured in a remaining sparse area on the same metal layer, to provide another branch to deliver electric power to electronic circuits.

It is another objective of the present invention to provide an interconnection structure of a chip that decreases the size of the chip and improves the uniformity of internal power-distribution of the chip.

It is still another objective of the present invention to provide a mask combination by which an additional supply-power area is formed around the metal lines of the metal layer to more effectively use the sparse area of the interconnection structure.

In accordance with the foregoing and other objectives of the present invention, a configuration method of interconnects of a chip is disclosed. A chip has a power bus, a first metal layer and a plurality of internal electronic circuits. The first metal layer includes a plurality of power lines, which are substantially parallel and are electrically connected to the power bus in parallel for delivering electrical power to the internal electronic circuits. A plurality of metal lines of a second metal layer of the chip are configured by an automatic place and route (APR) process according to the internal electronic circuits, and at least one sparse area is formed on the second metal layer. Later, at least one supply-power area is configured in the sparse area, and is electrically connected to the power bus.

According to one preferred embodiment of the invention, a spacing is located between the supply-power area and the metal lines, and the spacing is not less than a minimum dimension, which complies with a design rule for unrelated metal-to-metal spacing. Moreover, the supply-power area formed on the second metal layer is a solid metal area or a non-solid metal area, such as a mesh-like metal area.

The supply-power area of the invention and the power bus may be connected differently according to demand. According to embodiments of the invention, the supply-power area is electrically connected to one of the power lines with at least one via plug, such that the supply-power is electrically connected to the power bus indirectly. Alternatively, the supply-power area is electrically connected to the power bus directly, or is directly merged with the power bus.

For electrically connecting the supply-power area and the power lines, the quantity of layers connected by via plugs therebetween is plural, and those via plugs are directly stacked or indirectly stacked. In addition, according to another embodiment of the invention, when the quantity of the second metal layer is two, the positions of the two supply-power areas thereon substantially correspond to each other, thus forming a capacitor.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings, where:

DESCRIPTION OF THE PREFERRED EMBODIMENTS

Figure 1:
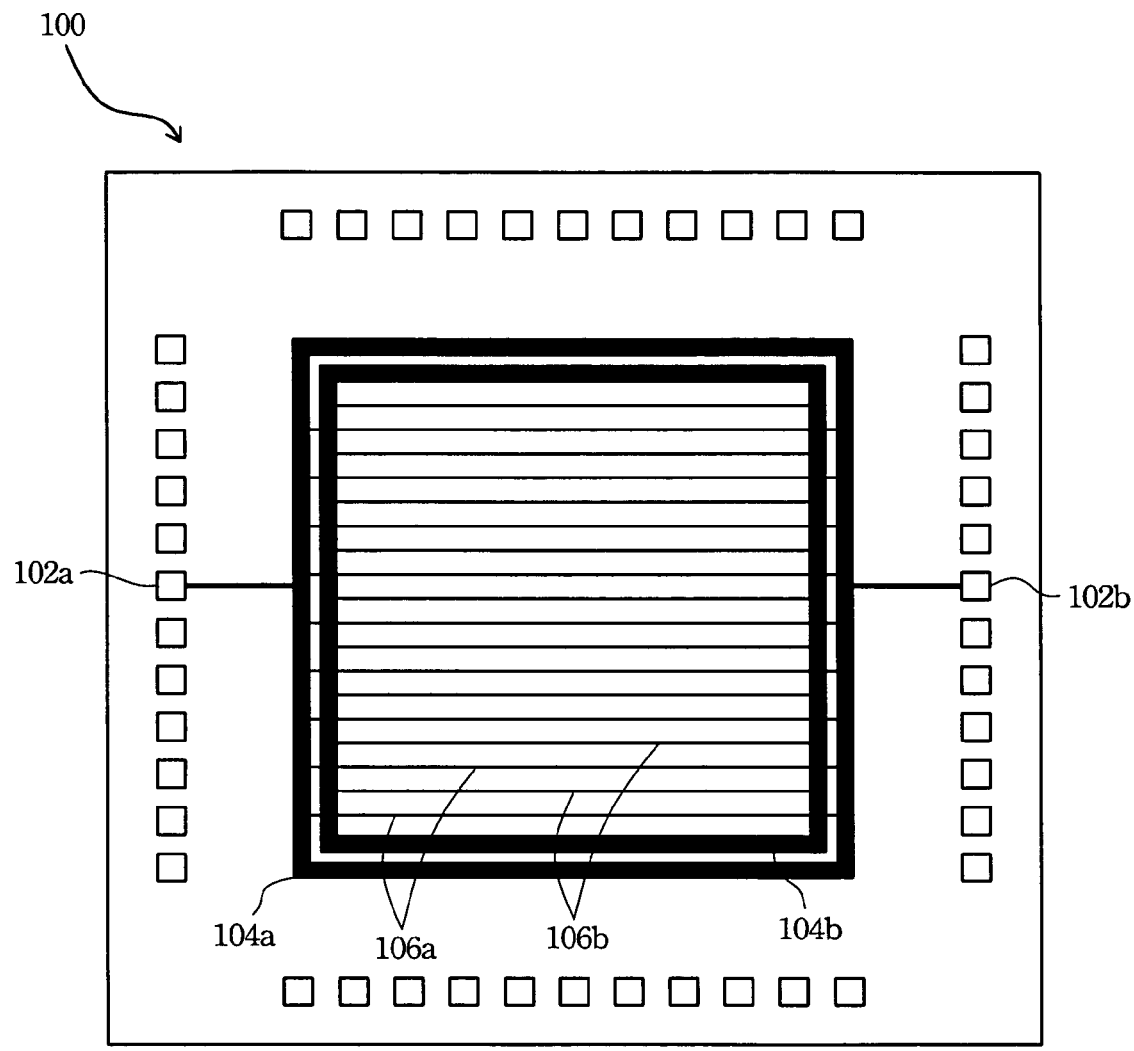
FIG. 1 illustrates a schematic view of a conventional power delivering structure of a chip.

Reference will now be made in detail to the present preferred embodiments of the invention, examples of which are illustrated in the accompanying drawings. Wherever possible, the same reference numbers are used in the drawings and the description to refer to the same or like parts.

Generally, in addition to a power delivering structure in FIG. 1 for delivering power, an interconnection structure of a chip further includes other interconnections for transmitting signals. When integrity of an integrated circuit is increased, and the chip cannot provide enough area to fabricate the necessary interconnections, an integrated circuit is manufactured with multiple metal layers. The layers of the multiple metal layers are connected by via plugs to form a complete circuit.

Inter-layer dielectric (IMD) layers are used to isolate the multiple metal layers for preventing the circuits thereof from making short one another. Moreover, contact plugs are used to connect the metal layer and electronic circuits beneath silicon substrate, such as sources and drains of transistors, for delivering electric power or electronic signal to the electronic circuits.

Figure 2:
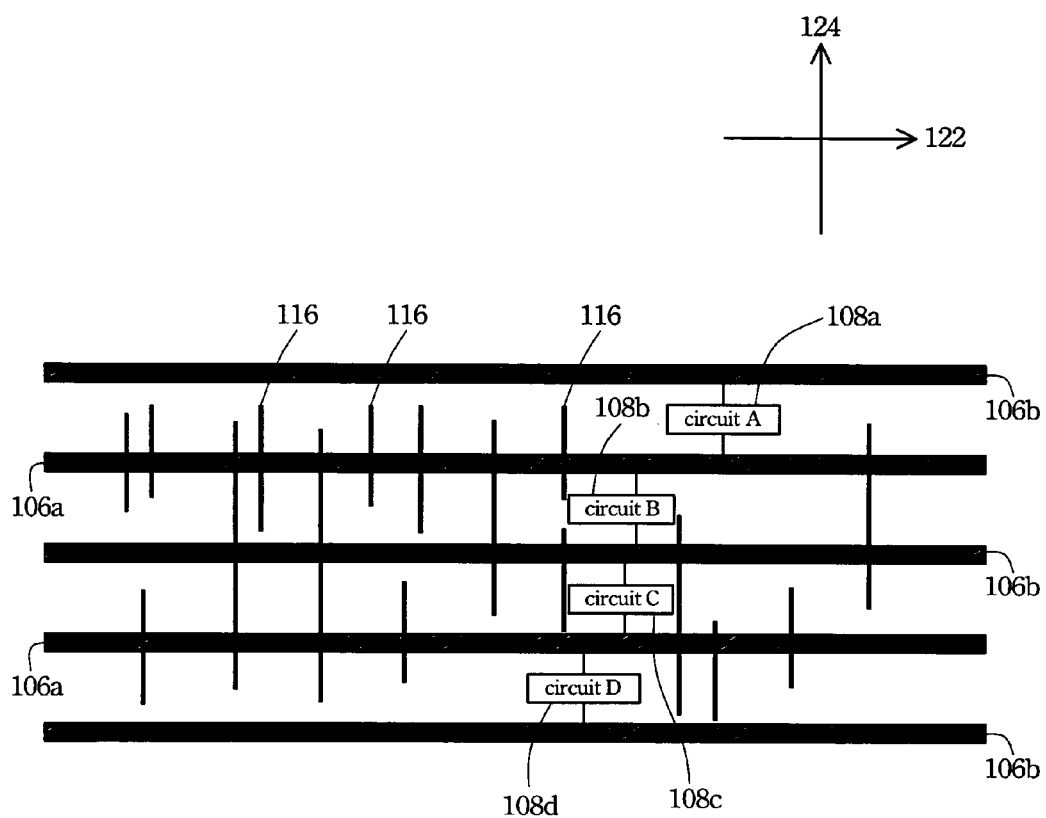
FIG. 2 illustrates a schematic view of interconnections of a chip having the multiple metal layers according to prior art.

FIG. 2 illustrates a schematic view of interconnections of a chip having the multiple metal layers. As illustrated in FIG. 2, power lines 106a and 106b are on a first metal layer (M1) of the multiple metal layers, and are parallel along a direction 122, for providing electric power to electronic circuits 108a, 108b, 108c and 108d. Metal lines 116, for transmitting electronic signals to electronic circuits 108a, 108b, 108c and 108d, are on a second metal layer (M2) of the multiple metal layers, and are parallel along a direction 124.

Moreover, as described above, there can be more than one layer for delivering electronic signal. As illustrated in FIG. 2, when more metal layers exist, metal lines on a third metal layer (M3) are parallel along the direction 122, and metals lines on a fourth metal layer (M4) are parallel along the direction 124. In other words, the directions of metal lines of two adjacent metal layers are perpendicular to each other, and metal lines of every metal layer are configured in compliance with this rule to optimize the placing and routing thereof.

In the integrated circuit technology, an automatic place and route (APR) process, with the Avanti Apollo, the Cadence Silicon Ensemble or other APR tools, is usually used to design the interconnections of the multiple metal layers, for optimizing the configuration of the interconnections and making it more efficient. In general, the densities of metal lines of different metal layers decreases with the increasing level of the metal layer; in other words, the metal layers of higher levels have fewer metal lines, and more sparse areas thereof remain.

The invention utilizes these remaining sparse areas as additional supply-power areas. As described above, the higher metal layers have more sparse areas, and are therefore more suitable for configuration of the supply-power areas of the invention. The additional supply-power areas as branches for providing electric power efficiently utilize the remaining areas of the chip, decrease the width of the conventional power ring, and resupply the areas having high power-consumption electronic circuits, thus improving the flexibility of the power delivering structure and preventing a regional voltage drop from affecting the performance of the chip.

Figure 3A:
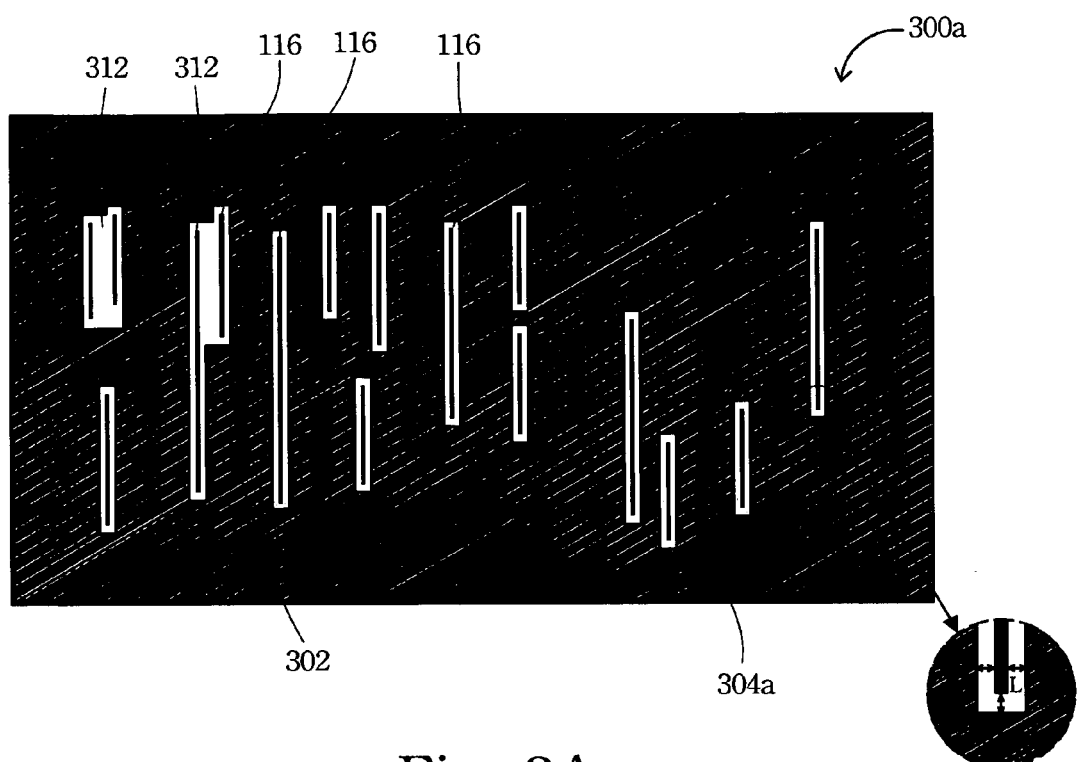
FIG. 3A illustrates a schematic view of one preferred embodiment of the invention.

The following descriptions take the second metal layer (M2) of FIG. 2 as an example, with FIG. 3A to FIG. 3D to illustrate a relationship between the supply-power areas of the invention and the metal lines 116. FIG. 3A illustrates a schematic view of one preferred embodiment of the invention. A mask 300a is a positive mask, and a pattern of an exposed and developed photo-sensitive material is the pattern of the positive mask. In contrast, if a pattern of the exposed and developed photo-sensitive material is complementary to a pattern of another mask, the mask is a negative mask.

The mask 300a is used to define the second metal layer (M2) in FIG. 2, and a first pattern of the mask 300a has a plurality of slot areas 302. Each slot area 302 contains one or more metal lines 116. A second pattern of the mask 300a has a supply-power area 304a, which is on the area excluding the foregoing slot areas 302, and the supply-power area 304a is a sold metal area in this preferred embodiment.

The supply-power area 304 is electrically connected to or merged directly with the power ring, thus substantially reducing transmission resistance from the power ring to the electronic circuits inside the chip, and also decreasing the width of the power ring by about 5 to 15 micrometers. According to another embodiment of the invention, the supply-power area 304a is electrically connected to one of the power lines 106a and 106b in FIG. 1 by at least one via plug, and the following description will illustrate this kind of connection.

It is noted that, in the present invention, a spacing L must be between the slot areas 302 and the contained metal lines 116, and the spacing L is not less than a minimum dimension which complies with a design rule for unrelated metal-to-metal spacing. Therefore, the supply-power area 304a does not affect the transmissions of the electronic signals by the metal lines 116 on the same metal layer (M2).

In addition, if a distance between two metal lines is very close, for instance, if the distance therebetween is about triple the minimum dimension of the design rule, the slot area of the invention can contain the two close metal lines together, as do slot areas 312 illustrated in FIG. 3A. In other words, the slot areas of the invention also can contain more than one metal line.

Figure 3B:
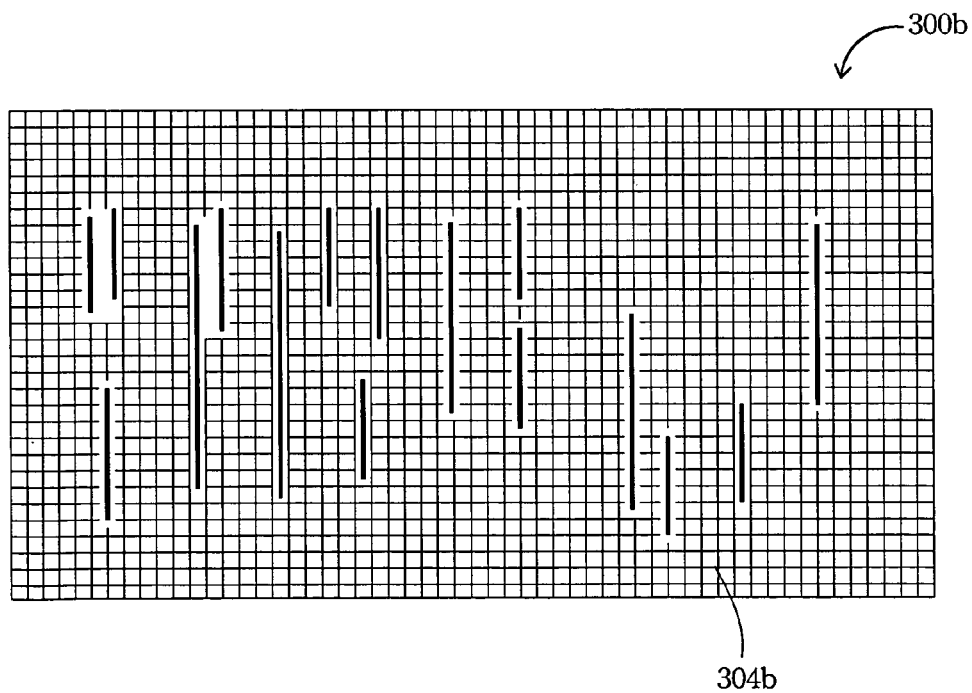
FIG. 3B illustrates a schematic view of another preferred embodiment of the invention.
Figure 3C:
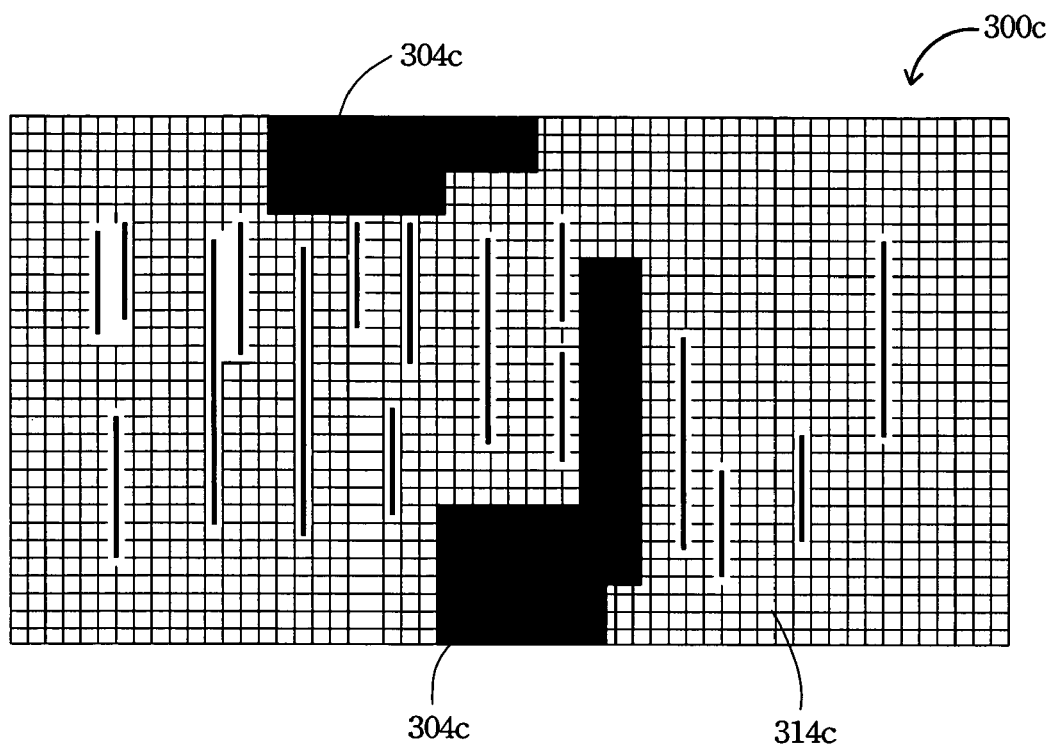
FIG. 3C illustrates a schematic view of another preferred embodiment of the invention.
Figure 3D:
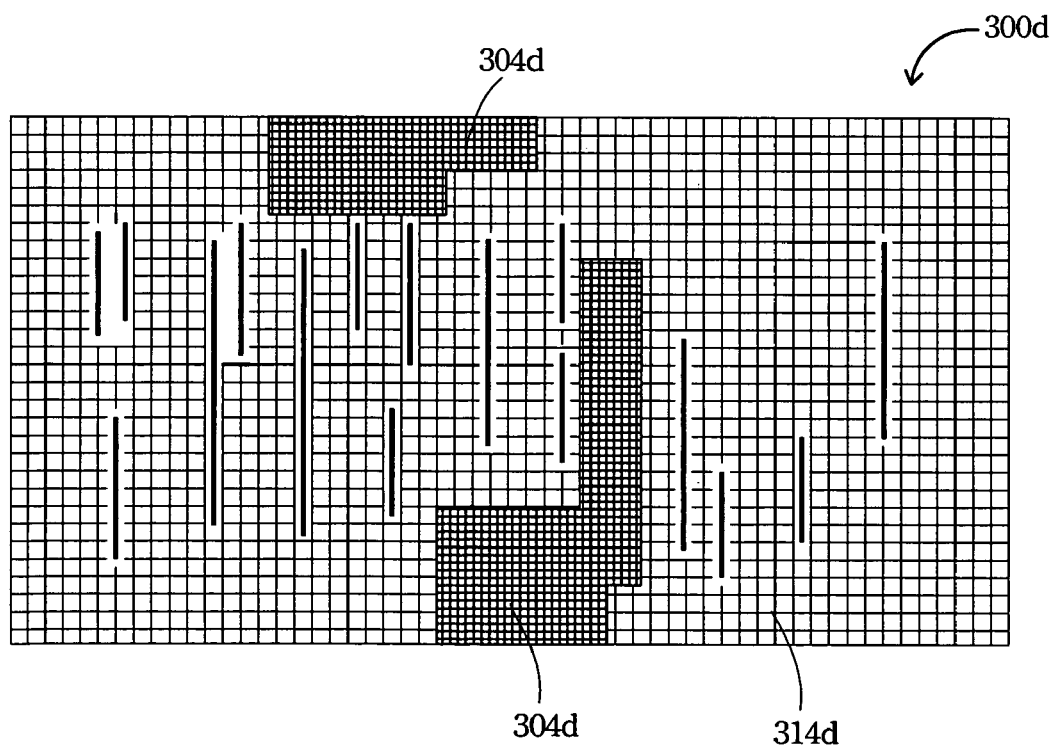
FIG. 3D illustrates a schematic view of another preferred embodiment of the invention.

FIG. 3B to FIG. 3D illustrate schematic views of other embodiments of the invention, for illustration that the supply-power area of the invention can be a non-metal area. The difference between a mask 300b in FIG. 3B and the mask 300a in FIG. 3A is that a supply-power area 304b in FIG. 3B is a mesh-like metal area.

Furthermore, the invention also can provide more than one different kind of the supply-power areas. For example, a mask 300c in FIG. 3C provides solid metal supply-power areas 304c and a mesh-like metal supply-power area 314c. A mask 300d in FIG. 3D provides two mesh-like metal supply-power area 304d and 314d having different mesh densities. The mesh density of the mesh-like metal supply-power area 304d is larger than that of mesh-like metal supply-power area 314d, such that the mesh-like metal supply-power area 304d provides higher current in a unit area. In another aspect, the mesh-like metal supply-power area 314d having low mesh density lowers the interconnect capacitance, and therefore is more suitable for configuration around the critical path electronic circuits.

As in the foregoing embodiments, the invention can adjust the quantity, positions and mesh densities of the supply-power areas according to the distribution of the electronic circuits and power requirements thereof, to improve the efficiency of power delivering and decrease the interference.

Figure 4A:
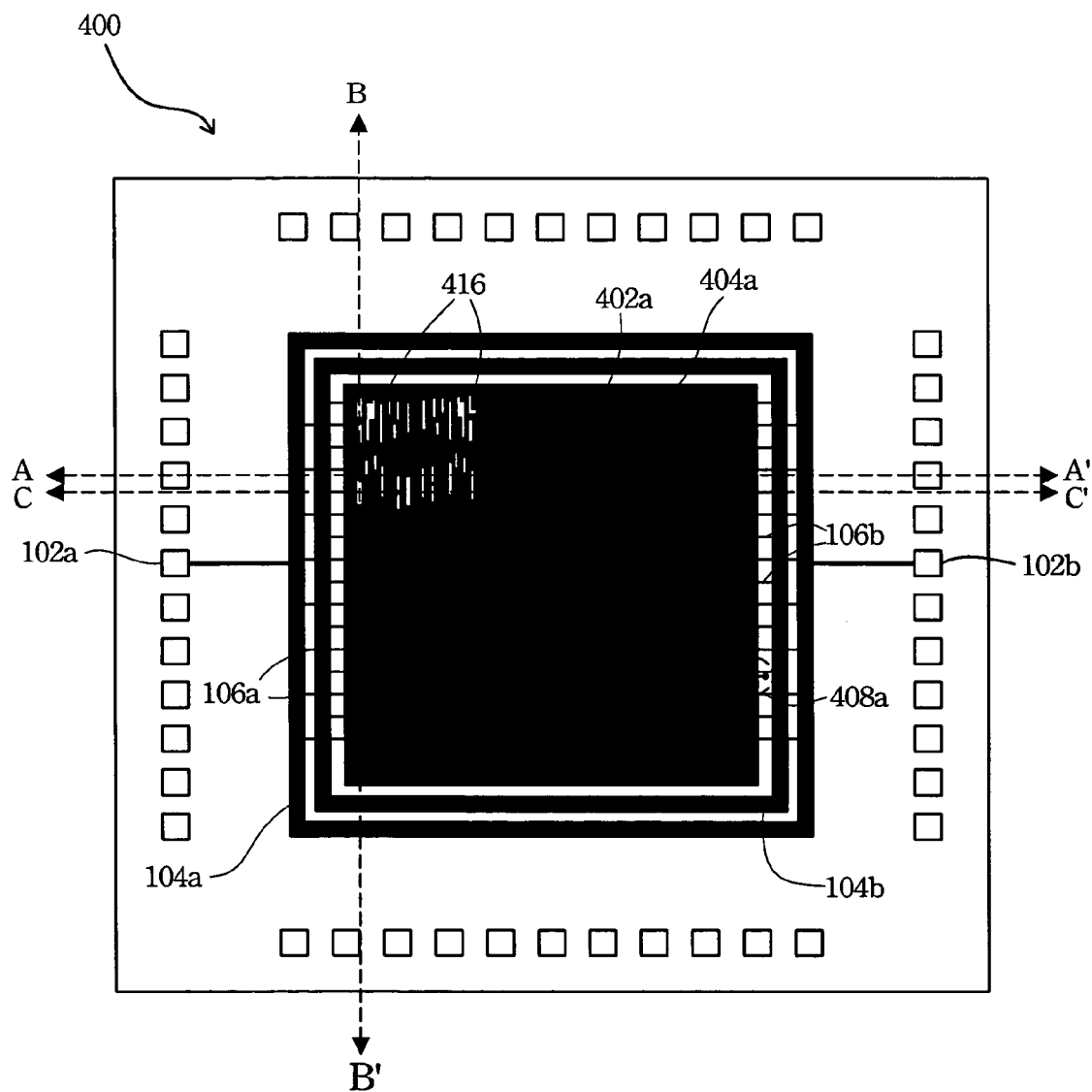
FIG. 4A illustrates a schematic view of one preferred embodiment of the invention.

FIG. 4A illustrates a schematic view of one preferred embodiment of the invention. Power rings 104a and 104b around a chip 400 are regarded as a power bus of the chip, and are connected to pad 102a and 102b, respectively, for proving different voltages. The voltage of the pad 102a is high (VDD), and the voltage of the pad 102b is low (VSS). Moreover, several power lines 106a and 106b are parallel in the core of the chip 100, and are connected to the power rings 104a and 104b, respectively. As illustrated above, these power lines 106a and 106b are on the first metal layer (M1) of the multiple metal layers of the chip 400.

The invention provides at least one supply-power area 404a on the higher metal layer of the multiple metal layers of the chip 400, such as the fourth metal layer 402a (M4). The fourth metal layer 402a further has a plurality of metal lines 416 separated from the supply-power area 404a by a spacing L (as illustrated in FIG. 3A). The supply-power area 402a of the invention can be alternatively connected to the high voltage or the low voltage, depending on the demand.

The connection of the supply-power area 404a and the power ring 104a or 104b is variable according to requirements. In this preferred embodiment, the supply-power area 404a is electrically connected to the power ring 104b directly with a connecting line 408a, for providing the low voltage (VSS).

Moreover, the supply-power area 404a can be directly merged with the power ring 104a or 104b for electrical connection. Further, the supply-power area 404a can even be electrically connected to the power line 106a or 106b with at least one via plug (not illustrated in the figure), and the supply-power area 404a is therefore electrically connected to the power ring 104a or 104b indirectly by the power line 106a or 106b, as illustrated in one preferred embodiment in FIG. 5C.

In addition, the area of the supply-power area 404a is enough to carry more currents, and therefore the invention can shrink the width of the conventional power ring 104a or 104b to reduce waste of the valuable area of the chip. According to another preferred embodiment of the invention, the supply-power area further can diminish the quantity of the sides of the power ring 140a or 104b. The power rings may be fully removed from a chip, and the supply-power areas are directly connected to the pad power bus of the chip, to take the place of the conventional power rings 104a and 104b.

Figure 4B:
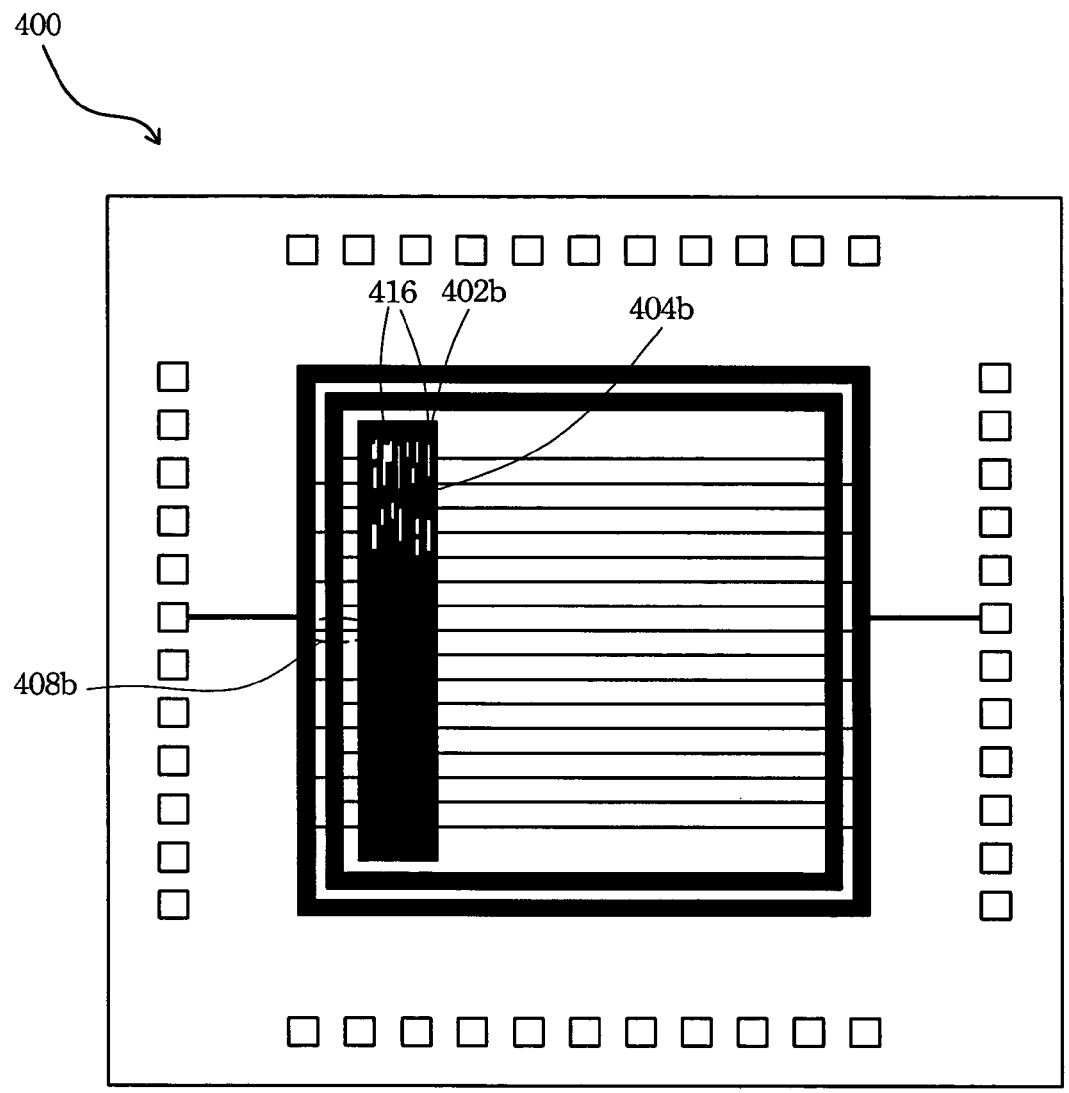
FIG. 4B illustrates a schematic view of another preferred embodiment of the invention.

FIG. 4B illustrates a schematic view of another preferred embodiment of the invention, for showing that the supply-power area of the invention can only occupy a portion of the sparse area of certain metal layer. As illustrated in FIG. 4B, for a third metal layer 402b (M3) of the multiple metal layers of the chip 400 and the fourth metal layer 402a (M4) in FIG. 4A, a difference therebetween is that a supply-power area 404b only occupies a portion of the third metal layer 402b, and does not fully occupy the total third metal layer 402b. Moreover, the supply-power area 404b is electrically connected to the power ring 104a for delivering the high voltage (VDD).

It is noted that, when the supply-power area 404a in FIG. 4A and the supply-power area 404b in FIG. 4B are formed together in the chip 400, the interconnection of the chip 400 increase the inter-layer capacitance between the high voltage and the low voltage of the power bus. The high interconnection facilitates to suppress noises of supply-lines, thus the invention can improve the stability of an integrated circuit.

Figure 5A:
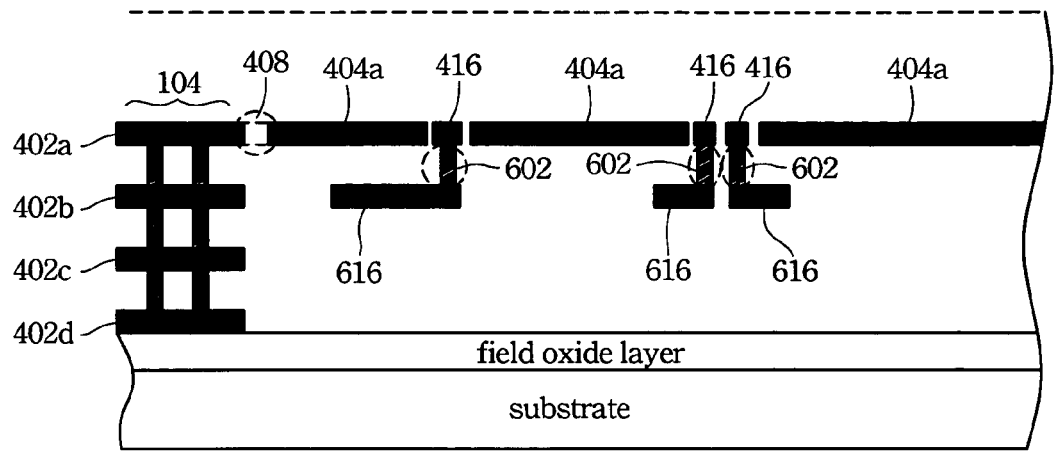
FIG. 5A illustrates a cross-sectional view taken along line AA' in FIG. 4A.
Figure 5B:
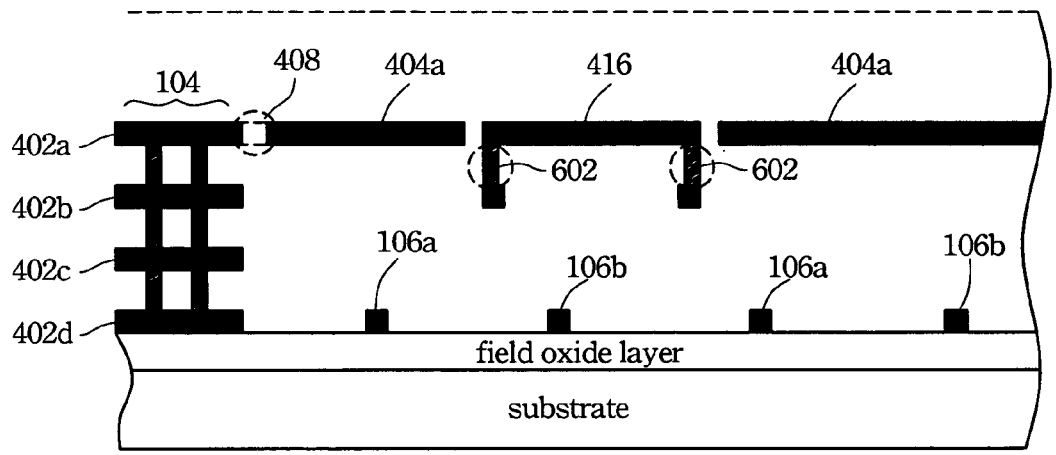
FIG. 5B illustrates a cross-sectional view taken along line BB' in FIG. 4A.
Figure 5C:
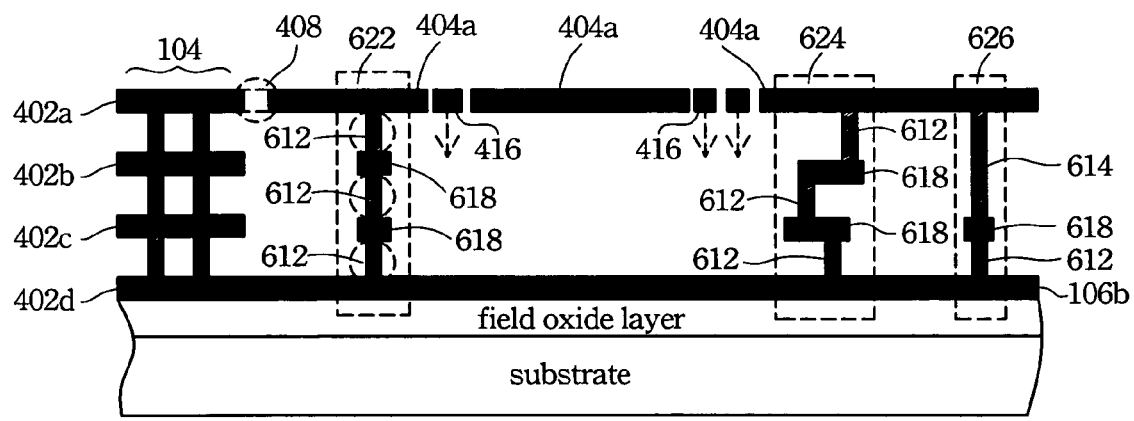
FIG. 5C illustrates a cross-sectional view taken along line CC' in FIG. 4A.

FIG. 5A to FIG. 5C illustrate relationships between the supply-power areas of the invention and other metal layers by taking the chip 400 in FIG. 4A as an example. FIG. 5A illustrates a cross-sectional view taken along line AA' in FIG. 4A. The chip 400 has an interconnection structure of multiple metal layers including four metal layers, the fourth metal layer 402a, the third metal layer 402b, the second metal layer 402c and the first metal layer 402d. A power ring 104 is a power bus of the chip 400; for convenience, the descriptions for the following figures all regard the power ring 104 as a power ring for providing the high voltage (VDD) or the low voltage (VSS).

As illustrated in FIG. 5A, metal lines 416 on the fourth metal layer 402a is electrically connected to metal lines 616 on the third metal layer 402b with via plugs 602. The supply-power areas 404a of the invention is electrically connected to the power ring 104 on the fourth metal layer 402a with a connecting line 408 (which is not on the cross-sectional line so as to be represented with dashed lines). FIG. 5B illustrates a cross-sectional view taken along line BB' in FIG. 4A. The line BB' is perpendicular to power lines 106a and 106b; therefore the cross-sections of the power lines 106a and 106b are illustrated in FIG. 5B.

FIG. 5C illustrates a cross-sectional view taken along line CC' in FIG. 4A, and the line CC' overlaps the power lines 106b, for showing how the supply-power area 404a is electrically connected to the power lines 106a or 106b with the via plugs, and is electrically connected indirectly to the power ring 104a or 104b with the power lines 106a or 106b.

The embodiment in FIG. 5C illustrates three connection types between the supply-power area 404a and the power line 106b. In a first connection type 622, the supply-power area 402a and power line 106b are connected with single-layer via plugs 612 and buffer supply-power areas 618 on every metal layer, and these single-layer via plugs are directly stacked.

In a second connection type 624, the supply-power area 402a and power line 106b are connected with single-layer via plugs 612 and buffer supply-power areas 618 on every metal layer, and these single-layer via plugs are indirectly stacked. The arrangement of the single-layer via plugs 618 in the second connection type 624 is not along a line, but provides a tortuous arrangement with the buffer supply-power areas 618 on every metal layers. It is therefore more flexible for the circuit design, in which the positions of the single-layer via plugs 618 between every two metal layers can be adjusted.

In a third connection type 626, the supply-power area 402a and power line 106b are connected with via plugs 614 across more than one layer and buffer supply-power areas 618 on some of metal layers, for illustrating that the via plugs are not limited to single-layer via plugs 612, and via plugs 614 across more than one layer can also be used in the invention. As described above, these three connection types are alternative dependant on conditions to enhance the flexibility of the invention.

Figure 6:
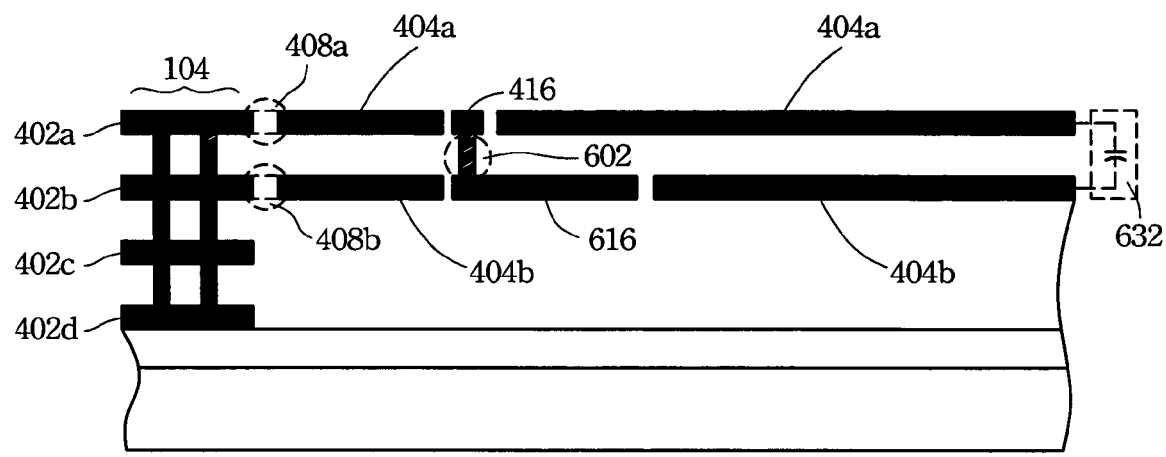
FIG. 6 illustrates a cross-sectional view taken along line AA' in FIG. 4A.

FIG. 6 illustrates a cross-sectional view taken along line AA' in FIG. 4A, where supply-power area 404a in FIG. 4A and the supply power area 404b are formed together in the chip. As illustrated in FIG. 6, the supply-power area 404a is electrically connected to the low voltage of the power bus, and the supply-power area 404b is electrically connected to the high voltage of the power bus. The supply-power areas 404a and 404b are formed as a capacitor structure because of their corresponding positions, and are equivalent to a capacitor 632. This interconnection structure equivalent to a capacitor can suppress noises of supply-lines, and therefore improves the stability of the integrated circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A configuration method of interconnects of a chip, the chip having a power bus, a first metal layer and a plurality of electronic circuits, wherein the first metal layer has a plurality of power lines, and the power lines are substantially parallel and connected to the power bus, the configuration method comprising:

generating a mask pattern of a plurality of metal lines of a second metal layer with an automatic place and route process for interconnection of said electronic circuits with at least one sparse area formed on the second metal layer; and generating another mask pattern of at least one supply-power area in the sparse area and providing connection path from the supply-power area to the power bus, wherein the supply-power area has a plurality of metal-line associated slot areas, and each said slot area contains a pattern of at least one of the metal lines.

2. The configuration method of claim 1, wherein the supply-power area is connected to one of the power lines with at least one via plug, whereby the supply-power area is connected to the power bus indirectly.

3. The configuration method of claim 1, wherein the supply-power area is connected to the power bus directly.

4. The configuration method of claim 1, wherein the supply-power area is directly merged with the power bus.

5. The configuration method of claim 1, wherein at least one spacing is between the supply-power area and the metal lines pattern.

6. The configuration method of claim 5, wherein the spacing is not less than a minimum dimension, and the minimum dimension complies with a design rule for unrelated metal-to-metal spacing.

7. The configuration method of claim 1, wherein the supply-power area is a solid metal area.

8. The configuration method of claim 1, wherein the supply-power area is a non-solid metal area.

9. The configuration method of claim 1, wherein the supply-power area is a mesh-like metal area.

10. The configuration method of claim 2, wherein when a quantity of the via plugs vertical to the first metal layer is plural, and the via plugs are directly stacked to connect the supply-power area and one of the power lines.

11. The configuration method of claim 2, wherein when a quantity of the via plugs vertical to the first metal layer is plural, the via plugs are indirectly stacked to connect the supply-power area and one of the power lines.

12. The configuration method of claim 1, wherein when a quantity of the second metal layers is two, positions of the two supply-power areas on the two second metal layers substantially correspond to each other with overlapping to form a capacitor.

13. An interconnection structure of a chip, wherein the chip has a power bus and a plurality of electronic circuits, the interconnection structure comprising:

a first metal layer having a plurality of power lines, wherein the power lines are substantially parallel and electrically connected to the power bus; and at least one second metal layer having a plurality of metal lines and at least one supply-power area, wherein the metal lines are formed by an automatic place and route process for interconnection of said electronic circuits, and at least one sparse area is formed on the second metal layer, the supply-power area is formed in the sparse area and electrically connected to the power bus, and the supply-power area has a plurality of metal-line associated slot areas, and each said slot area contains at least one of the metal lines.

14. The interconnection structure of claim 13, wherein the supply-power area is electrically connected to one of the power lines with at least one via plug, whereby the supply-power is electrically connected to the power bus indirectly.

15. The interconnection structure of claim 13, wherein the supply-power area is electrically connected to the power bus directly.

16. The interconnection structure of claim 13, wherein the supply-power area is directly merged with the power bus.

17. The interconnection structure of claim 13, wherein at least one spacing is located between the supply-power area and the metal lines.

18. The interconnection structure of claim 17, wherein the spacing is not less than a minimum dimension, and the minimum dimension complies with a design rule for unrelated metal-to-metal spacing.

19. The interconnection structure of claim 13, wherein the supply-power area is a solid metal area.

20. The interconnection structure of claim 13, wherein the supply-power area is a non-solid metal area.

21. The interconnection structure of claim 13, wherein the supply-power area is a mesh-like metal area.

22. The interconnection structure of claim 14, wherein when a quantity of the via plugs vertical to the first metal layer is plural, the via plugs are directly stacked to connect electrically the supply-power area and one of the power lines.

23. The interconnection structure of claim 14, wherein when a quantity of the via plugs vertical to the first metal layer is plural, the via plugs are indirectly stacked to electrically connect the supply-power area and one of the power lines.

24. The interconnection structure of claim 13, wherein when a quantity of the second metal layers is two, the positions of the two supply-power areas on the two second metal layers are substantially corresponding to each other with overlapping for forming a capacitor.

* * * * *